United States Patent [19]
Linn

[11] Patent Number: 6,032,687
[45] Date of Patent: Mar. 7, 2000

[54] WATER CONSERVATION SYSTEM

[76] Inventor: Mark S. Linn, 3013 Mayview Pl., Virginia Beach, Va. 23452

[21] Appl. No.: 08/872,490

[22] Filed: Jun. 7, 1997

[51] Int. Cl.[7] .................................................. F16K 49/00
[52] U.S. Cl. ........................ 137/337; 126/362; 236/12.12
[58] Field of Search ........................ 137/337; 236/12.12; 126/362

[56] References Cited

U.S. PATENT DOCUMENTS

| | | | |
|---|---|---|---|
| 2,967,666 | 1/1961 | Carlson | 126/362 |
| 3,112,497 | 12/1963 | Call . | |
| 3,188,656 | 6/1965 | Drager . | |
| 3,413,969 | 12/1968 | Whittell, Jr. | 126/362 |
| 3,594,825 | 7/1971 | Reid | 4/2 |
| 3,799,181 | 3/1974 | Maddren | 137/377 |
| 4,162,218 | 7/1979 | McCormick | 137/386 |
| 4,197,597 | 4/1980 | Toms | 4/2 |
| 4,870,986 | 10/1989 | Barrett et al. | 126/362 |
| 5,105,846 | 4/1992 | Britt | 137/337 |
| 5,261,443 | 11/1993 | Walsh | 137/337 |
| 5,339,859 | 8/1994 | Bowman | 137/337 |

*Primary Examiner*—A. Michael Chambers

[57] ABSTRACT

A water conservation system having a control element and flow regulation device, the combination of which is in series with a hot water source and water discharge outlet. The water conservation system may further, or alternatively, comprise a shunt pipe extending substantially from the hot water source to a water discharge outlet and parallel to the hot water supply pipe. When ambient or low temperature water is detected in the hot water supply pipe, the combination control element and flow regulation device may divert low temperature water to a holding tank which preferably stores the water at atmospheric pressure. The holding tank may provide make-up water to a toilet's primary water closet or be used in other areas where clean water is desired or required. When the combination control element and flow regulation device senses water at a relative higher (or a predetermined or pre-selected) water temperature, a diverter pipe to the holding tank is closed, and the hot water is redirected to a water discharge outlet. A configuration comprising a shunt pipe, a hot water supply pipe, and flow regulation devices also provides an internal diversion of ambient and hot water to blend the same to make hot water substantially immediately available at a water discharge outlet.

25 Claims, 13 Drawing Sheets

WATER CONSERVATION SYSTEM

BACKGROUND OF THE INVENTION

1. Field of the Invention

The present invention relates to a water conservation system. More particularly, the present invention relates to a system for diverting, and/or conserving for subsequent use, ambient temperature water within a hot water plumbing system.

2. Description of the Prior Art

It is a well known occurrence that during periods of non-use, hot water in hot water pipes cools, approaching, for purposes of this discussion, ambient temperature. Typically, this slug of ambient water occupies the volume of the hot water plumbing which is downstream from the hot water source and upstream of a hot water discharge outlet.

When water is initially discharged from a hot water pipe, ambient water therein must be purged from the hot water pipe before heated water is begins to discharge. This slug of ambient water is typically uncomfortable for personal use and thus, wasted. In plumbing systems where there is a substantial distance between the discharge outlet and the hot water source, this wasted ambient water may represent a considerable loss, both economically and environmentally.

Many prior art systems have been disclosed which propose to conserve water, most particularly potable domestic water. Included among these systems are in-house waste water reclamation and treatment facilities (as exemplified in U.S. Pat. No. 4,197,597). Such facilities are relatively complex. They typically require a substantial capital investment. They generally need specialty parts and fittings which are not commonly found in the plumbing industry. Such facilities are also susceptible to plumbing backups. Moreover, they are not well suited for retrofit applications. In addition, such systems may require external (i.e., electrical) power supplies and/or continuous maintenance. Also among the prior art are water recirculation systems (as exemplified in U.S. Pat. Nos. 3,2,497, 3,594,825, 3,188,656, and 4,162,218) which accumulate waste or "grey" water (i.e., waste water from sinks, tubs, dishwashers, and the like) in supplemental tanks until needed, then recycle the grey water to flush toilets. Such systems store dirty, smelly water for prolonged periods of time and present potential health hazards. A problem common to virtually all prior art water conservation systems is that they require a supplemental pump (and corresponding supplemental power supply) to transport the waste water from a collection point (i.e., downstream of a sink or tub drain) to a toilet's water closet. In an effort to overcome this problem, particularly limited systems (such as gravity flow systems) have been proposed wherein the toilet's water closet is disposed at a substantially lower elevation relative to the collection point (i.e., the sink or tub drain). Such systems, however, have an exceptionally narrow application, and are not suited for retrofit use, and, again, depend on the use and storage of grey water.

SUMMARY OF THE INVENTION

The present invention is a water conservation system which is structured and configured to divert or purge ambient water in a hot water plumbing system from the hot water supply pipes, directly or indirectly, to a toilet's water closet or other storage area. Alternatively, ambient water in the hot water pipes may be blended with water from a hot water source or supply, thus eliminating the need for diversion and storage. As yet another alternative, ambient water may be selectively diverted and blended.

Ambient water in a hot water plumbing system may be diverted towards to a toilet's water closet or other storage area through the aid of a control element which senses the presence of ambient water in a hot water plumbing system. When the ambient water is purged therefrom, the control element senses the presence of relatively warmer or hot water and directs the warmer or hot water towards the water discharge outlet.

Ambient water may be blend by regulating the flow of the hot water supply upstream of the water discharge outlet. This may be accomplished by constricting or controlling the delivery of ambient water arriving at a point of intersection of the hot water supply pipe and a parallel shunt pipe to allow proportional blending of the ambient water within the hot water supply pipe and truly heated water provided by the shunt pipe. The blended water may be discharged downstream through a water discharge outlet, such as a spigot, faucet, appliance, shower faucet and head assembly, or a combination of the same.

The hot water supply pipe may include a valve, fitting, or other flow regulating device or element, such as a pressure balance throttle valve, for simultaneously regulating flow through a plurality of water discharge outlets.

Of course, the temperature or other conditions present in the hot water plumbing system may be utilized to control valves, fittings, or other flow regulating devices or elements, which operate on low voltages. Voltages may be generated from heat, such as heat from the hot water source, or may be supplied from an external voltage source, such as that derived from household batteries. The use of such voltages is only for convenience and is collateral to the operation of the present invention.

A plumbing system according to the present invention may be constructed using commonly available plumbing elements and components such as conventional pipe, conduit, tubing, fittings, valves (including throttle valves, of course), orfice plates, venturis. Although conventional elements and components will suffice, specifically constructed components may be readily utilized in the present invention. The present invention is adaptable for retrofit applications on existing plumbing systems, as well as new plumbing installations.

Accordingly, it is a principal object of the present invention to provide a water conservation system capable of using water normally wasted during normal operation of a hot water plumbing system.

It is another object of the present invention to provide a water conservation system capable of delivering "clean" ambient water in a hot water supply pipe to a toilet's primary water closet to supplement the primary water closet's operation, to an auxiliary or secondary water closet or storage area, or to some other area or areas where the use of clean water is desired or required.

It is yet another object of the present invention to provide a water conservation system capable of blending the ambient water in the hot water pipe with heated water in the shunt pipe and discharging the same through the water discharge outlet.

Another object of the present invention to provide a water conservation system which may be easily maintained and which generally conforms to existing common plumbing codes, standards, and design practices.

It is still another object of the present invention to provide improved elements and arrangements thereof in an apparatus for the purposes described which is energy efficient, environmentally advantageous, inexpensive, dependable and fully effective in accomplishing its intended purposes.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
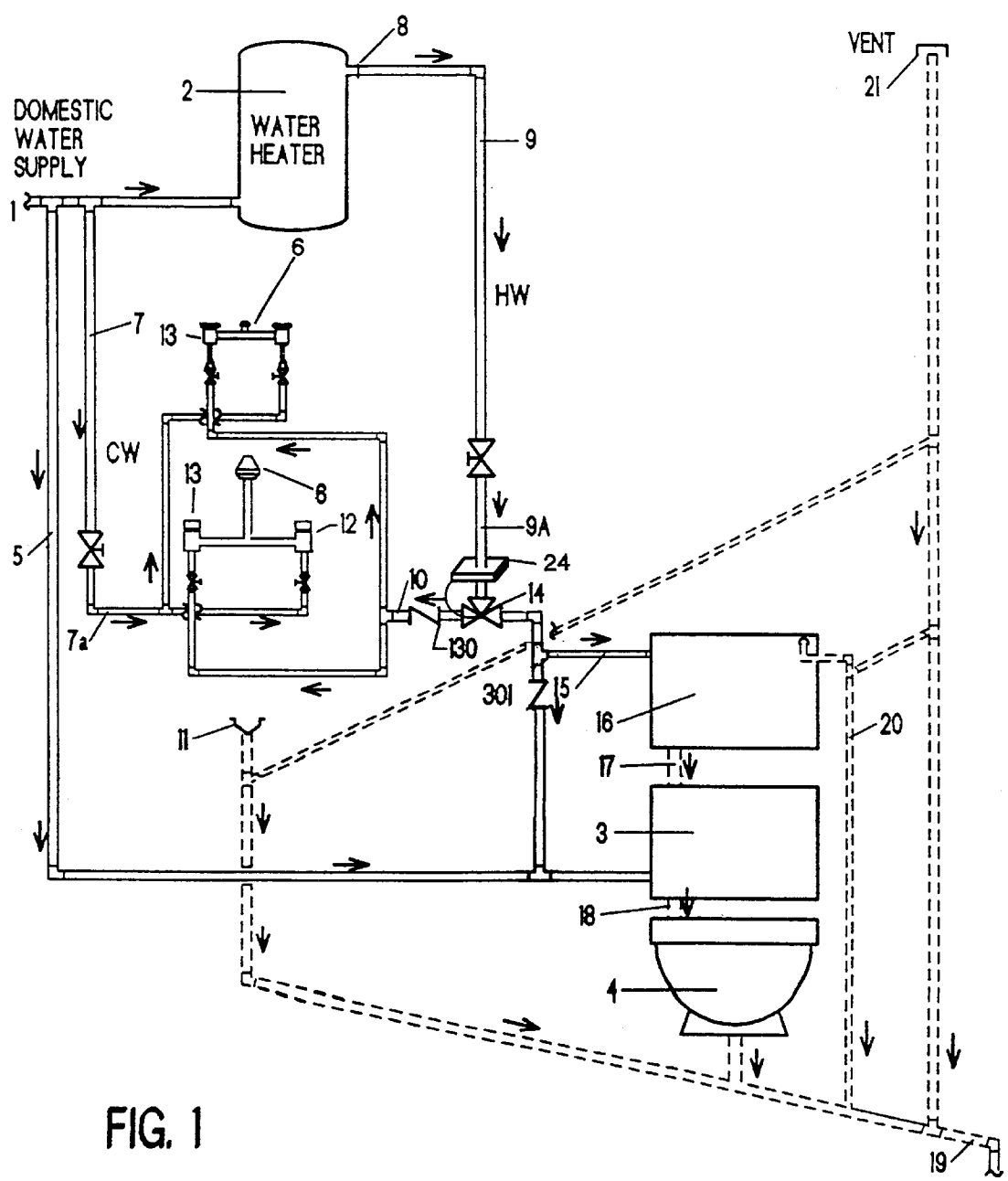
FIG. 1 is a schematic representation of a water conservation system according to the present invention showing a dual water closet configuration and a control element in combination with flow regulating device for diverting ambient water in the hot water supply pipe to an auxiliary or secondary water closet.

In reference to the drawings, and more particularly to FIG. 1, a non-recirculating, unidirectional water conservation system according to the present invention is used in cooperation with a pressurized water supply pipe 1 and connected to a heat source or hot water source or supply 2, such as a hot water heater. The pressurized water supply pipe 1 is connected to a primary water closet 3 (via cold water supply pipe 5) and a water discharge outlet 6, such as a shower faucet and head assembly, (via cold water pipes 7 and 7a).

Pressurized water is heated by the hot water source 2. The outlet or discharge side 8 of the hot water source 2 is connected via hot water pipes 9, 9a and 10 to the water discharge outlet 6. A "cold water" valve, fitting, or other flow regulating device 12, such as the throttle valve shown, regulates the flow of cold water through cold water pipes 7 and 7a to the water discharge outlet 6. Water released through water discharge outlet 6 goes down a waste or drain pipe 11.

A "hot water" valve, fitting, or other flow regulating device 13, such as a throttle valve, may be provided in series with the atmospheric hot water discharge outlet 6 and the hot water source 2 to regulate the flow of water through the hot water pipes 9 and 9a.

Figure 3:
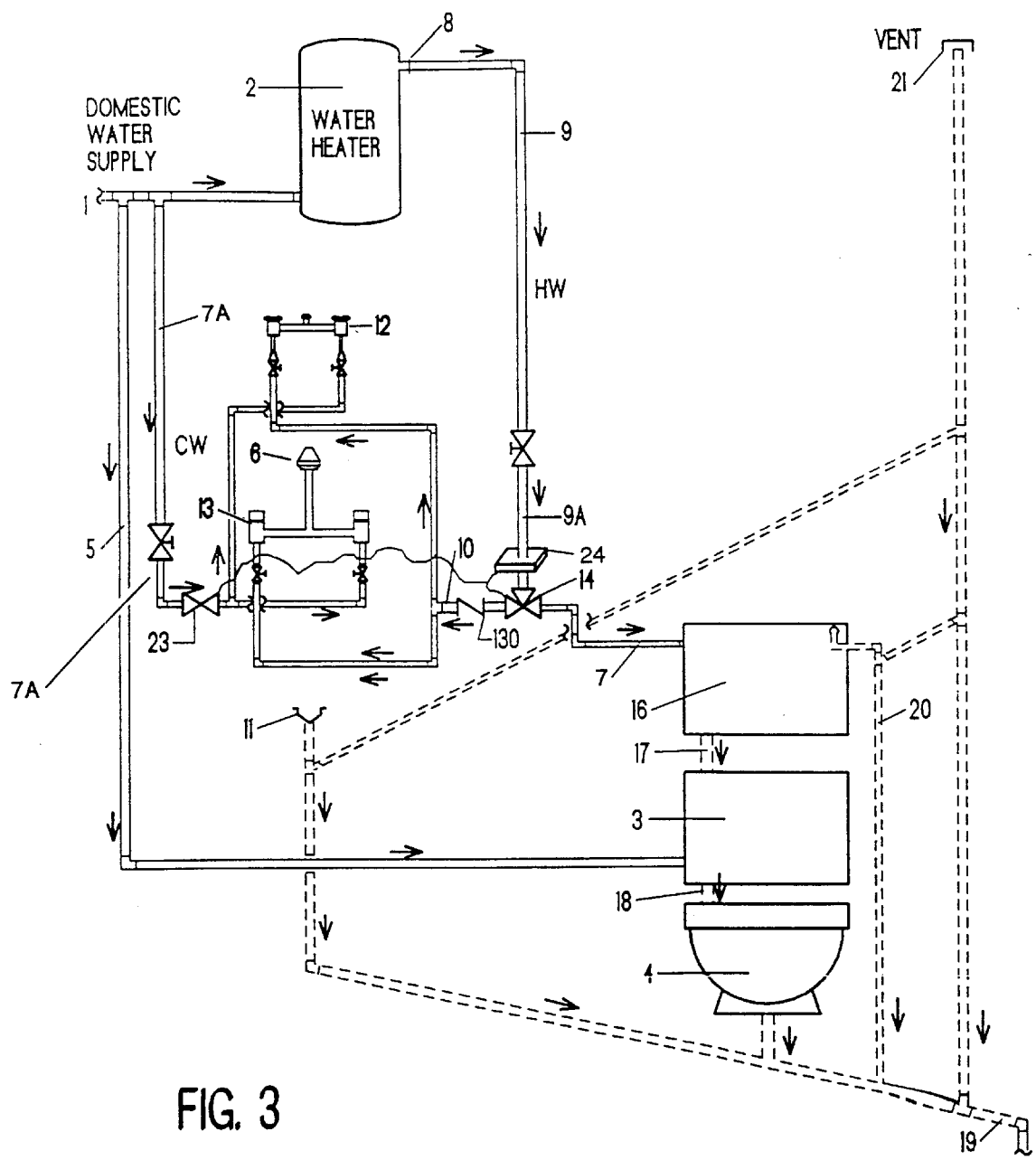
FIG. 3 is a schematic representation of a water conservation system as illustrated in FIG. 1 further comprising a flow regulating device for regulating fluid flow through the cold water pipe.

A diverter valve, fitting or other flow regulating device 14, such as a thermostatically controlled valve, may be connected in series with the "hot water" valve 13 and the water discharge outlet 6. The diverter valve 14 is in communication with a control element or device 24, such as a temperature sensor which senses the temperature of the water inside hot water supply pipe 9a. An example of such a control element or device 24 is schematically represented in FIGS. 1 and 3 as being remote to (albeit in communication with) the diverter valve 14. As will be discussed in further detail below, the control device 24 may, in practice, be constructed remotely or as an intrinsic component of the diverter valve 14. In operation, pressurized water enters the diverter valve 14 via hot water supply pipe 9a, and exits therefrom via either hot water pipe 10 or diverter pipe 15, depending upon the temperature of the water which is sensed by the control element 24.

The diverter pipe 15 may be connected to a reservoir or holding tank, such as the auxiliary or secondary water closet 16 shown. A holding tank 16 is preferably located at an elevation above the primary water closet 3. The primary water closet 3 and holding tank 16 are each preferably open vessel-type (i.e., non-pressurized) holding tanks.

The holding tank 16 is connected to the primary water closet 3 by a discharge pipe 17 which allows for gravity flow of water from the inside of the holding tank 16 to the primary water closet 3. An overflow pipe 20 is connected from the holding tank 16 to a waste or drain pipe 19. A discharge pipe 18 between the primary water closet 3 and a corresponding toilet bowl 4 allows for gravity flow (i.e., upon flushing the toilet) of water from inside of the primary water closet 3 to the toilet bowl 4. The toilet bowl 4 is connected to the waste or drain pipe 19. The drain pipe 19 is vented to the atmosphere (via a vent 21).

Figure 2:
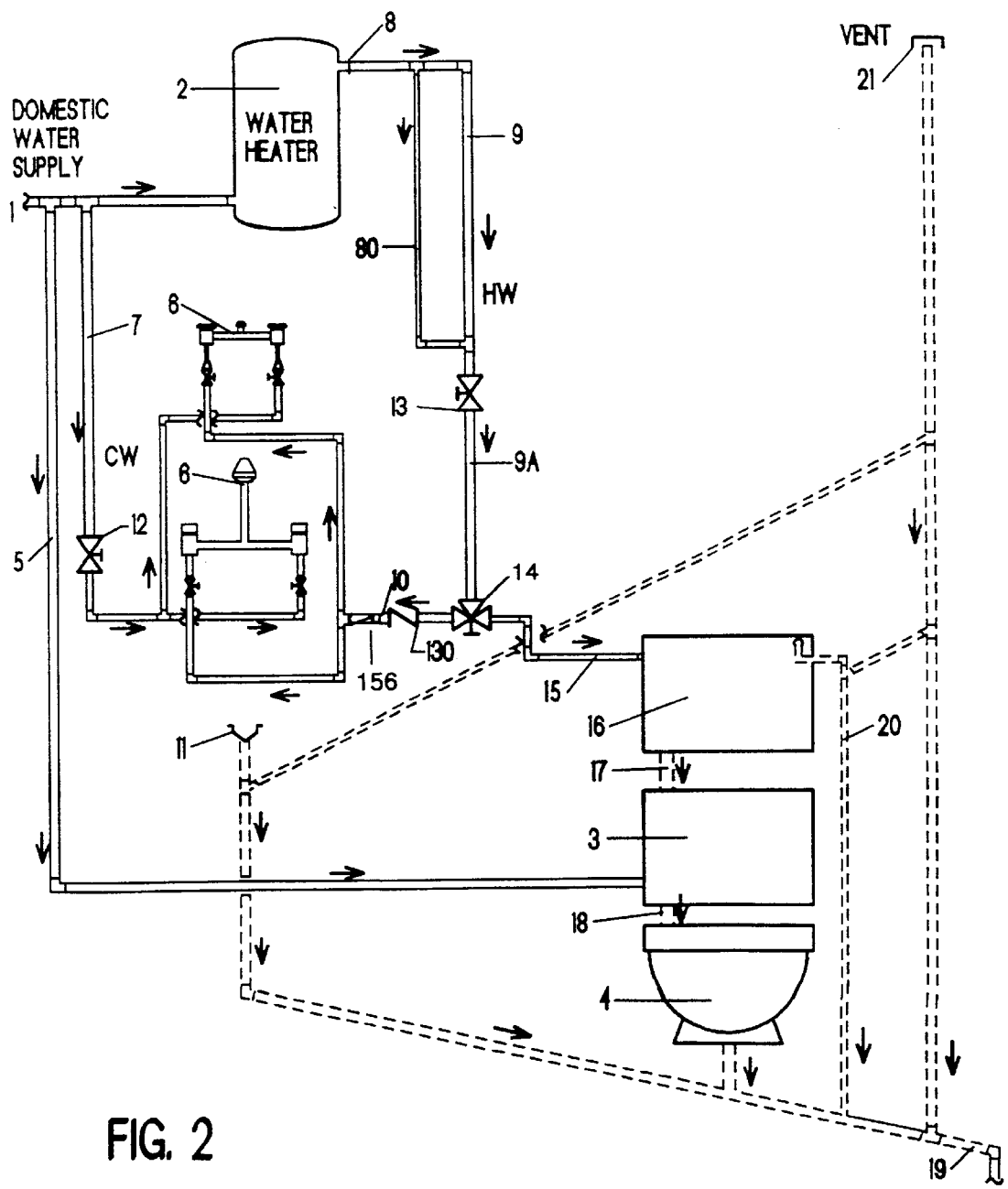
FIG. 2 is a schematic representation of a water conservation system having a dual water closet configuration and a shunt pipe and manually controllable flow regulating devices for diverting ambient water in the hot water supply pipe to an auxiliary or secondary water closet and for constricting flow through the hot water supply pipe upstream of the shunt pipe.

An alternative water conservation system is shown in FIG. 2. In this water conservation system, a diverter valve, fitting or flow regulating device 14, such as a manual diverter valve, is provided in series with the hot water valve 13 and water hot water pipe 10 and diverter pipe 15, similar to that of the thermostatically controlled diverter valve set forth above in the description of FIG. 1.

Another water conservation system is shown in FIG. 3. This water conservation system includes a valve, fitting or other flow regulating device 24, such as a thermostatically controlled cold water lock-out valve, located in the cold water pipe 7a upstream of the water discharge outlet 6. The valve 24 is in communication with a control element 23, such as a water temperature sensor. When the control element 23 senses relatively a low temperature water in the hot water supply pipe 9a, it signals the diverter valve 14 to interrupt hot water flowing from the hot water source 10 enroute to the water discharge outlet 6 and regulates the opening of cold water pipe 7 leading to the holding tank 16, and additionally closes the valve 24 in the cold water pipe 7a. When the control element 23 senses a predetermined water temperature in the hot water supply pipe 9a, it signals the valve 14 to interrupt the flow through pipe 7 leading to the holding tank 16 and regulates the opening of, or permits flow through, the hot water pipe 10 leading to the shower head 6 and additionally opens the valve 24 in the cold water pipe 7a.

Figure 4:
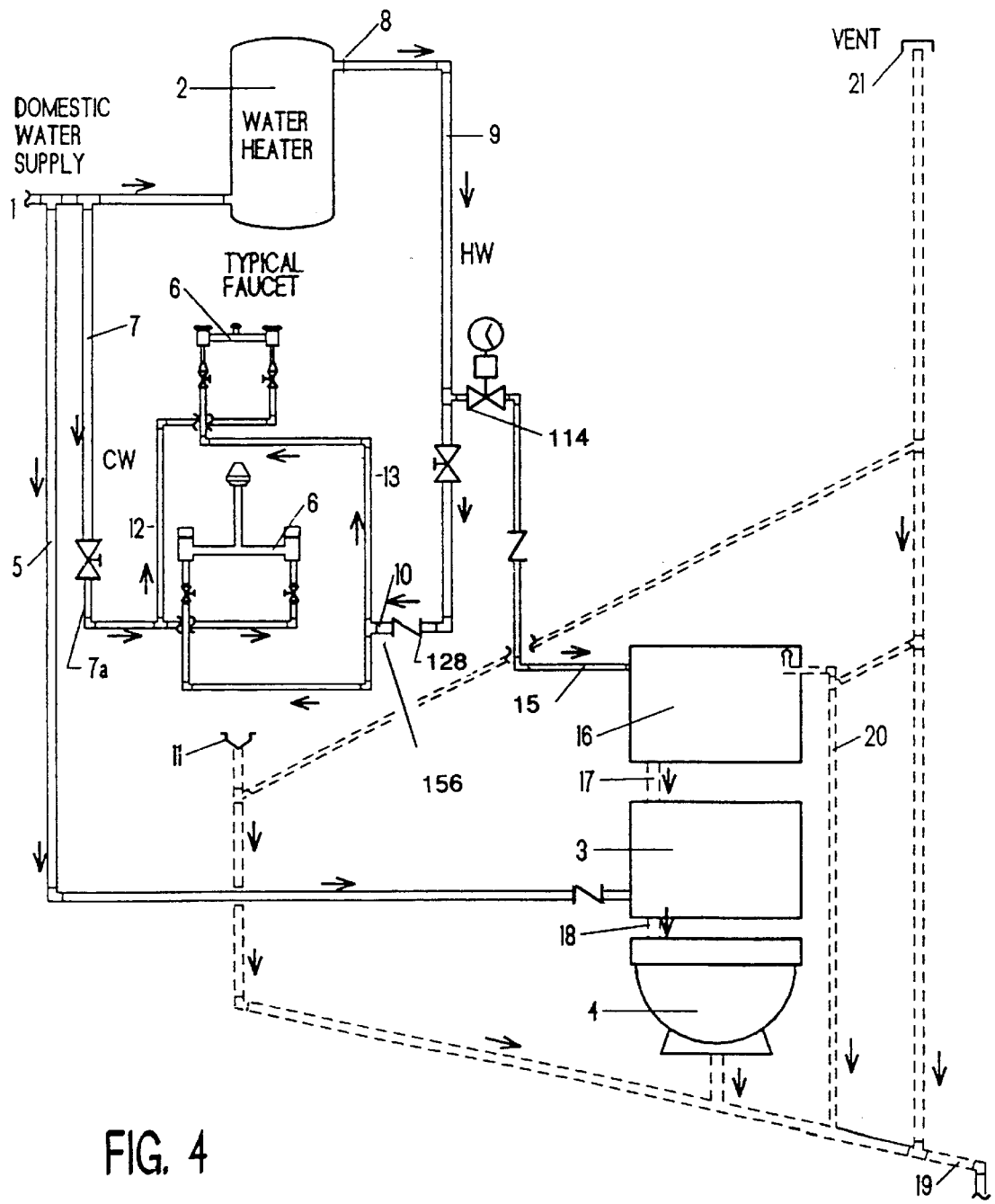
FIG. 4 is a schematic representation of a water conservation system as illustrated in FIG. 1 further comprising a control element integral with a flow regulating device for constricting flow through the hot water supply pipe upstream of the shunt pipe.

FIG. 4 shows yet another water conservation system. This water conservation system includes a diverter valve, fitting, or other flow regulating device, in combination with a control device 114, such as a single manually adjustable, thermostatically controlled, diverter valve having a built-in bimetallic temperature sensor. A unidirectional flow device, such as a check valve 128 or the like, may be provided in the pipe 15 leading from the diverter valve 114 to the holding tank 16 to prevent water from backflowing from the holding tank 16.

Of course, any of the foregoing configurations may also incorporate a shunt pipe 80, which will be discussed in detail hereinbelow.

Figure 5:
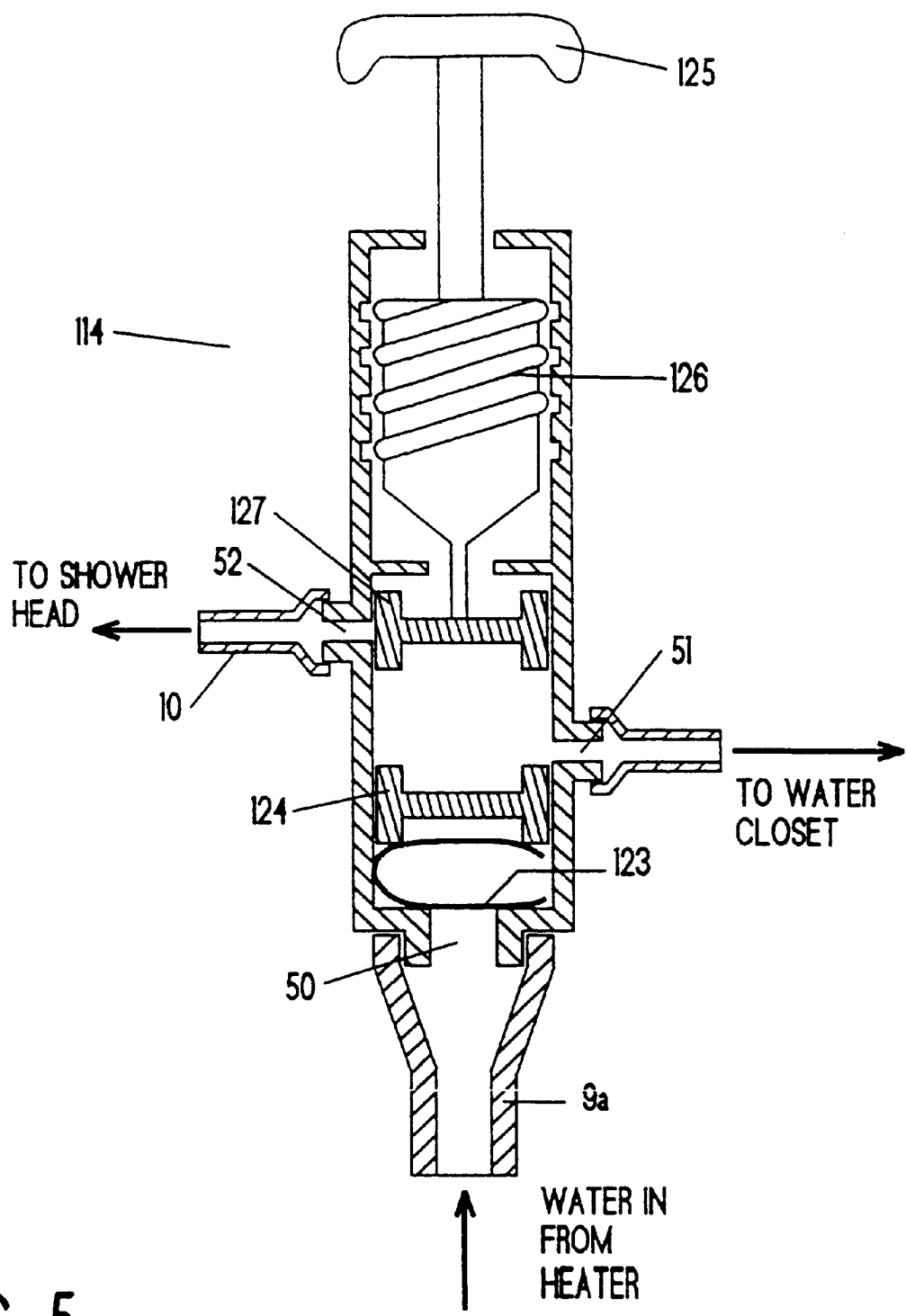
FIGS. 5–7 are cross-sectional views showing the construction and operation of the integral control element and flow regulating device illustrated in FIG. 4.
Figure 6:
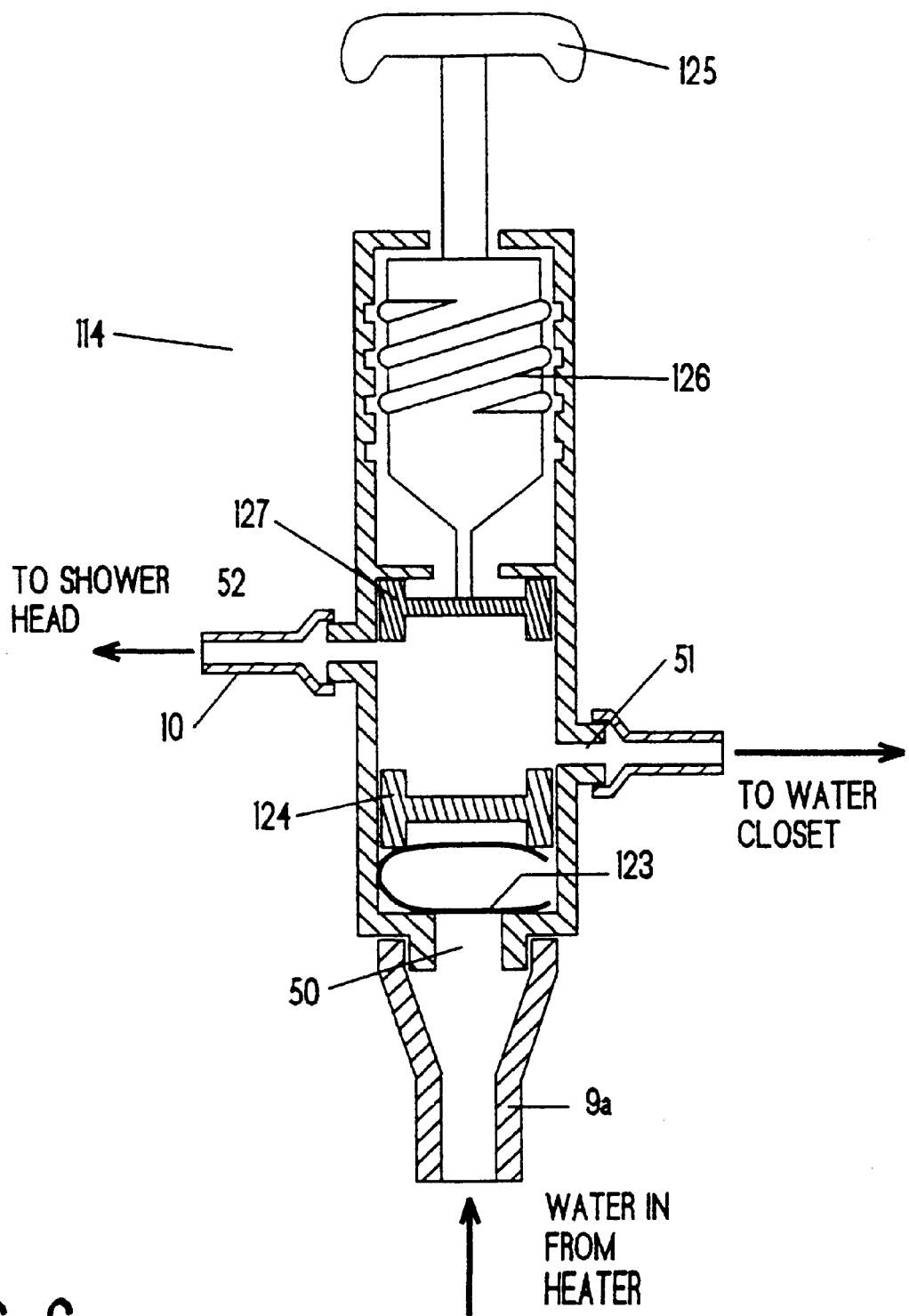
Figure 7:
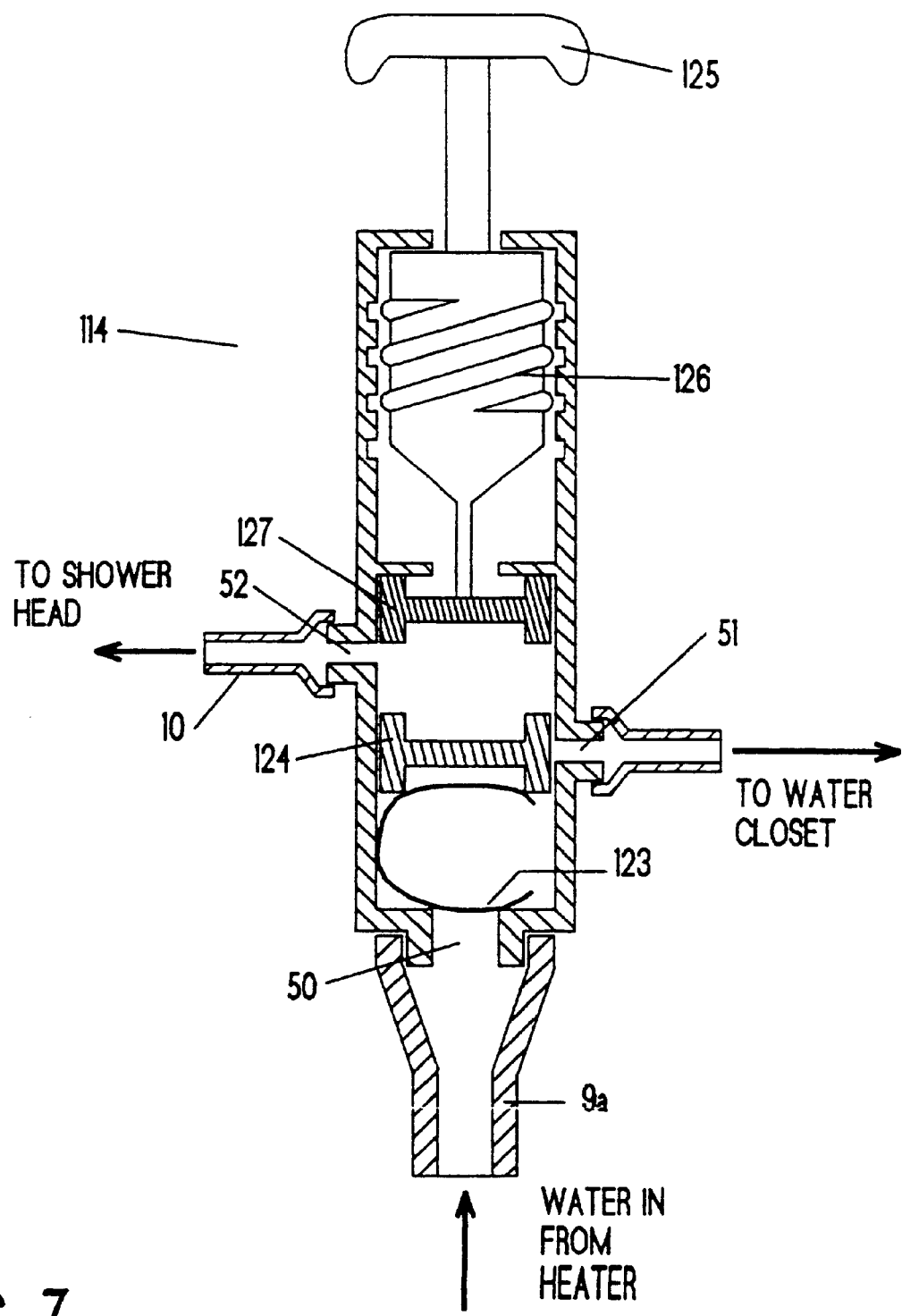

FIGS. 5–7 show construction details of a manually adjustable, thermostatically controlled MATC diverter valve set forth above in the description of FIG. 4 as a diverter valve 114. The MATC diverter valve has a hot water inlet orifice 50, a cold water outlet orifice 51, and a hot water outlet orifice 52. In operation, the hot water inlet orifice 50 is attached to the hot water supply pipe 9 which leads from the hot water source 2. The cold water outlet orifice 51 is attached to the diverter pipe 15 which leads to the holding tank 16. Lastly, the hot water outlet orifice 52 is attached to the hot water pipe 10 leading to the water discharge outlet 6. A temperature sensitive bimetallic sensor 123 is attached to an axially moveable annular valve seat 124. At lower temperatures, the bimetallic sensor 123 contracts, pulling the annular valve seat 124 away from, and thus opening, the cool water outlet orifice 51 (as is illustrated in FIGS. 5 and 7). When heated to a predetermined or pre-selected temperature, the bimetallic sensor 123 expands, displacing the annular valve seat 124 to regulate, or prevent, the water flow through the cool water outlet orifice 51 (as illustrated in FIG. 6). A control element, such as the handle 125 shown, is connected to a threaded stem 126 and a second axially moveable annular valve seat 127. When the handle 125 is adjusted in one direction the threaded stem 126 regulates, or prevents, water flow through the second annular valve seat 127, by closing it against the hot water outlet orifice 52 (as illustrated in FIG. 5). When the handle 125 is adjusted in the opposite direction the threaded stem 126 pulls the second annular valve seat 127, thus opening the hot water outlet orifice 52 (as illustrated in FIGS. 6 and 7).

Figure 9:
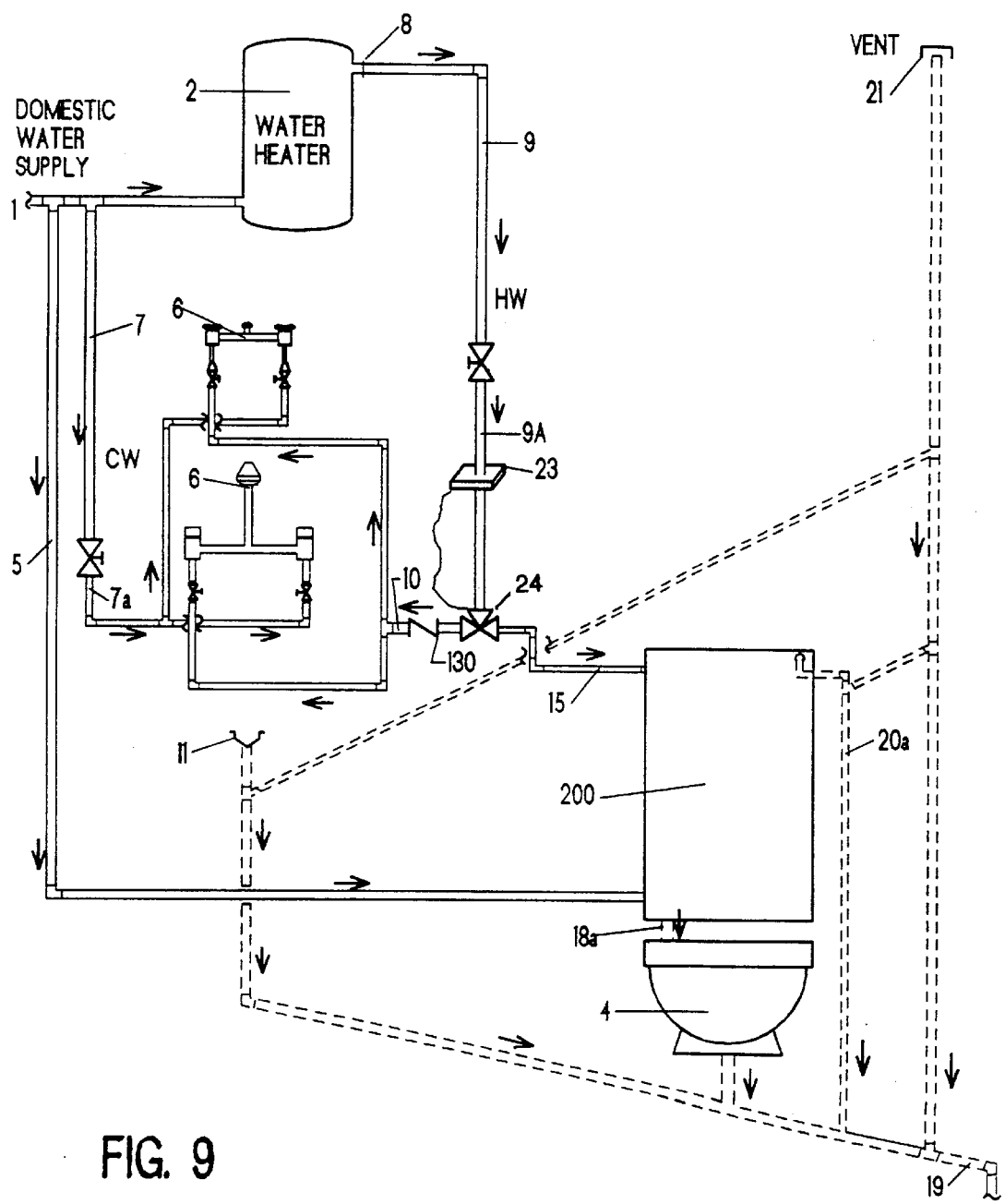
FIG. 9 is a schematic representation of a water conservation system as illustrated in FIG. 1 having a single, extended water closet configuration instead of a dual-water closet configuration.

FIG. 9 shows yet another water conservation system, wherein no holding tanks are used. Alternatively, a single, extended water closet 200 is provided, the significance of which will be discussed hereinbelow.

Figure 11:
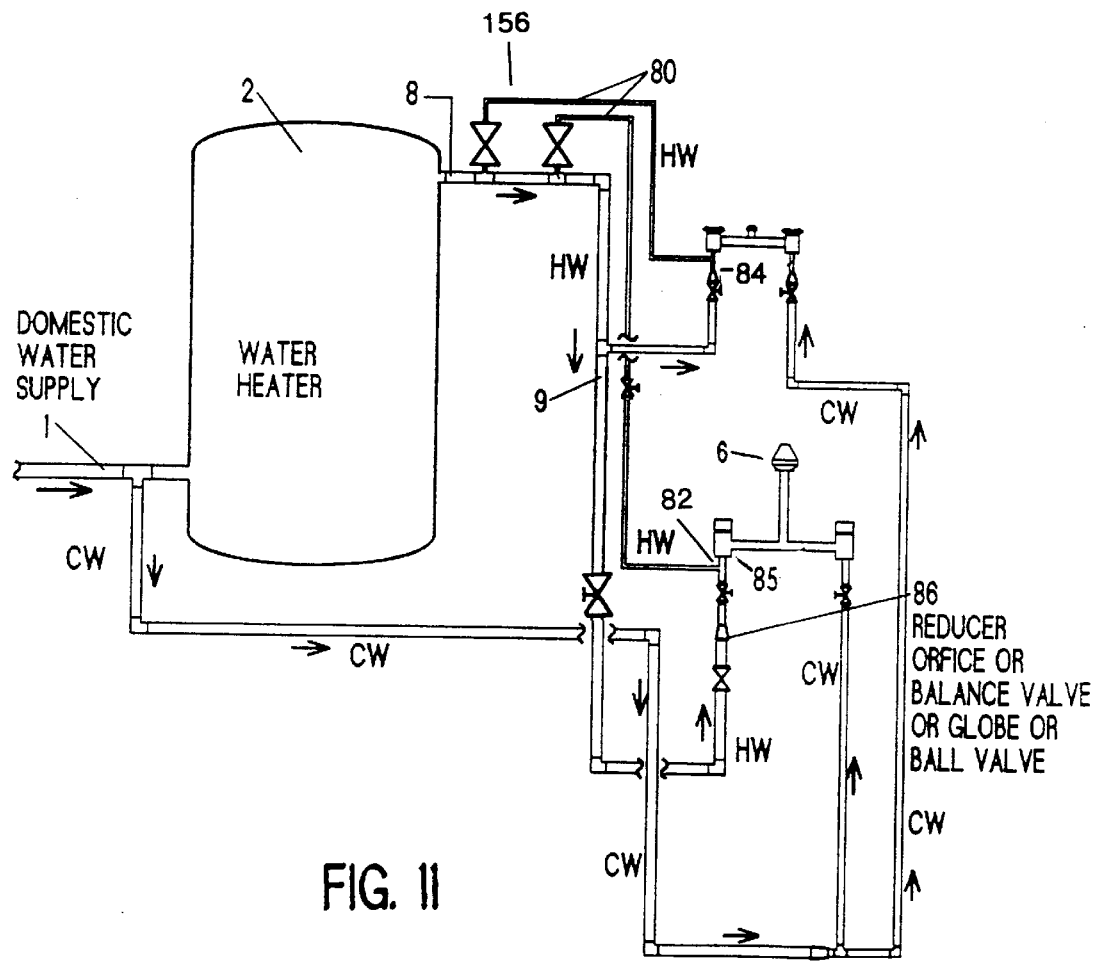
FIG. 11 is a schematic representation of a water conservation system having a plurality of shunt pipes and corresponding flow regulating devices for constricting flow through hot water supply pipe(s) upstream of the shunt pipes.

FIG. 11 illustrates yet another water conservation system. This system has a hot water shunt pipe 80 connected to the discharge side 8 of a hot water source 2 and running parallel to the hot water supply pipe 9. The hot water supply pipe 9 and the shunt pipe 80 intersect at a fitting 84 connected to a water discharge outlet, such as at the juncture of the hot water faucet supply tube 82. The hot water faucet supply tube 82 is connected to a hot water discharge device, such as a spigot, faucet, appliance, shower faucet and head assembly, or a combination of the same. In this embodiment, the hot water supply pipe 9 has a diameter greater than both the shunt pipe 80 and the hot water faucet supply tube 82. For example, the hot water supply pipe 9 preferably ranges from ⅜ inch to ¾ inch; the hot water shunt pipe 80 preferably ranges from ¼ inch to ⅝ inch; and the hot water faucet supply tube 82 preferably ranges from ¼ inch to ⅝ inch. A valve, fitting, or other flow regulating device 86, such as the reducer valve or fitting, may be provided in the hot water supply pipe 9 to regulate or accommodate the change in diameter from the hot water supply pipe 9 and the hot water faucet supply tube 82.

Although conventional element and components, a modified reducer tee fitting 84a (see FIG. 12) may be used at the intersection of the hot water supply pipe 9 and the shunt pipe 80. This modified reducer tee 84a has orifices of varying dimensions, such as a ⅛ inch to ⅞ inch orifice to accommodate the hot water supply pipe 9, a ¼ inch to ⅝ inch orifice to accommodate the shunt pipe 80, and a ¼ inch or ⅝ inch orifice to accommodate the hot water faucet supply tube 82.

The shunt tube 80 illustrated in FIG. 11 may be similarly adaptable for use with any or each of the other embodiments discussed herein and illustrated in the figures.

Figure 13:
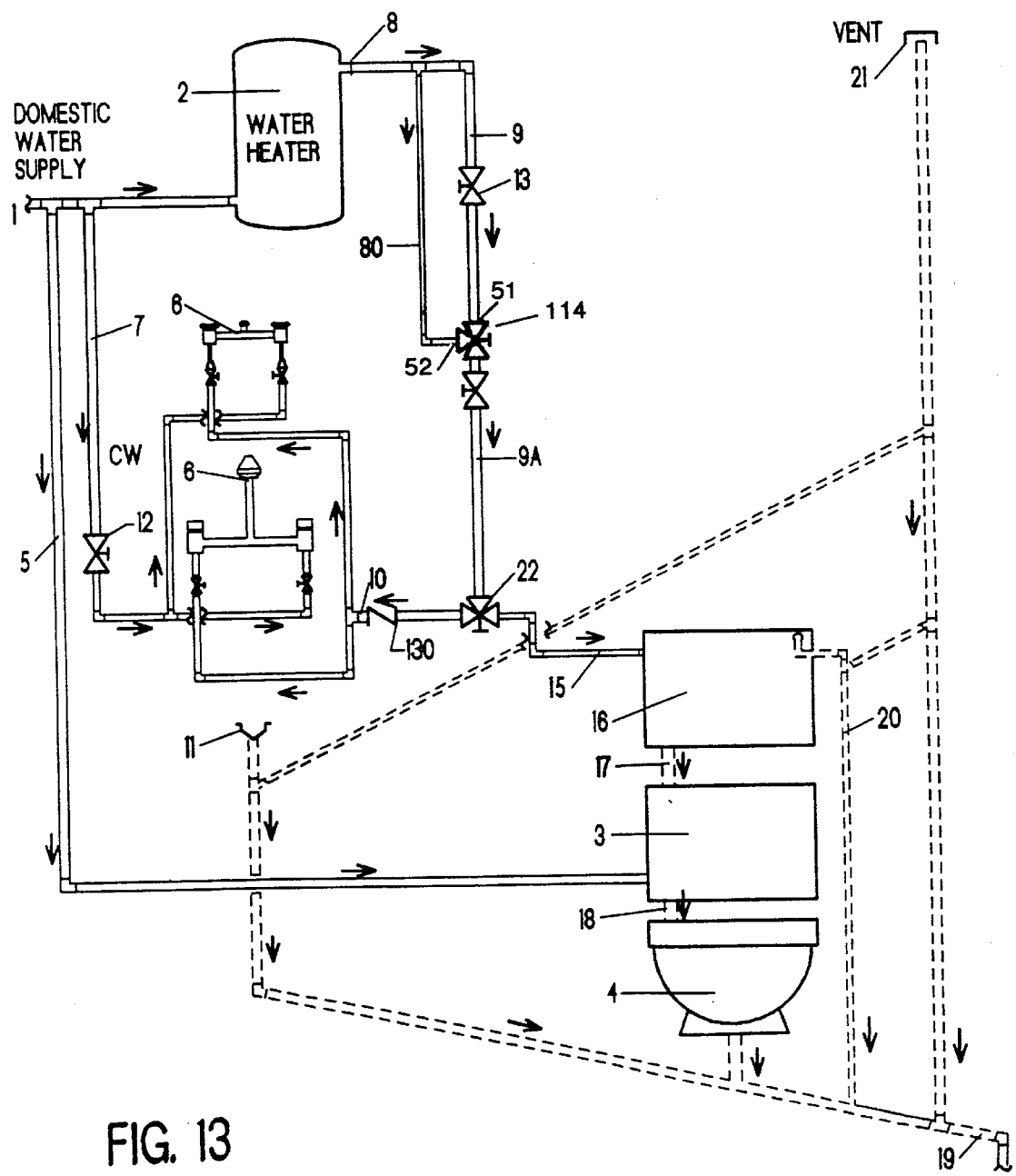
FIG. 13 is a schematic representation of another water conservation system having a shunt pipe configuration.

The water conservation system illustrated in FIG. 13 does not employ a diverter configuration as is set illustrated in FIGS. 1 though 4 and 9. Instead an integrated control element and flow regulating device 114, such as a manually adjustable, thermostatically controller MATC valve, is used to take advantage of the hot water supplied by the shunt pipe 80, and ambient water supplied by the hot water supply pipe 9. These water streams, namely, the hot water supplied by the shunt pipe 80 and the ambient water supplied by the hot water supply pipe 9, are diverted internally to provide hot water directly to the water discharge outlet 6.

Now, once again with reference FIG. 1, a mode of operation of a water conservation system according to the preferred invention is set forth as follows. When a person wishes to discharge or use hot water, such as through a spigot, faucet, appliance, shower faucet and head assembly, or a combination of the same, the hot water valve 13 is opened. Water which is under pressure from the pressurized water supply pipe I enters the inlet side of the hot water source 2. Incoming water pushes hot water out of the hot water source 2 through the discharge side 8 of the hot water source 2.

This, in turn, causes the ambient water (which is initially occupying the volume inside of the hot water supply pipe 9 between the discharge side 8 of the hot water source 2 and the hot water valve 13) to begin to flow past the control element 23 and through the diverter valve 14, preferably a thermostatically controlled diverter valve. In the event that the ambient water which has cooled below a predetermined or pre-selected temperature, or cannot be blended to achieve a given temperature (for example, a temperature below 1 degree Fahrenheit, as may typically occur when a stagnant slug of water is allowed to remain inside of the hot water supply pipe 9 for long periods of time), control element 23 will cause the diverter valve 14 to restrict the flow of water traveling in the direction of the water discharge outlet 6 (shown here as a faucet and shower) via hot water pipe 10 and simultaneously divert flow in the direction of the holding tank 16, such as an auxiliary or secondary water closet, via diverter pipe 15.

Water under pressure enters the holding tank 16 via diverter pipe 15, thus filling the holding tank 16. If the holding tank 16 is already full of water (or becomes full of water), the water in the holding tank 16 will simply pass into the overflow pipe 20, and pass to the waste or drain pipe 19. The holding tank 16 is preferably an open vessel, thus the water inside of the holding tank 16 is not under pressure. As set forth above, the water inside the holding tank 16 may be used to supplement the water supply to the primary water closet 3 or elsewhere where clean water is desired or required.

Figure 8:
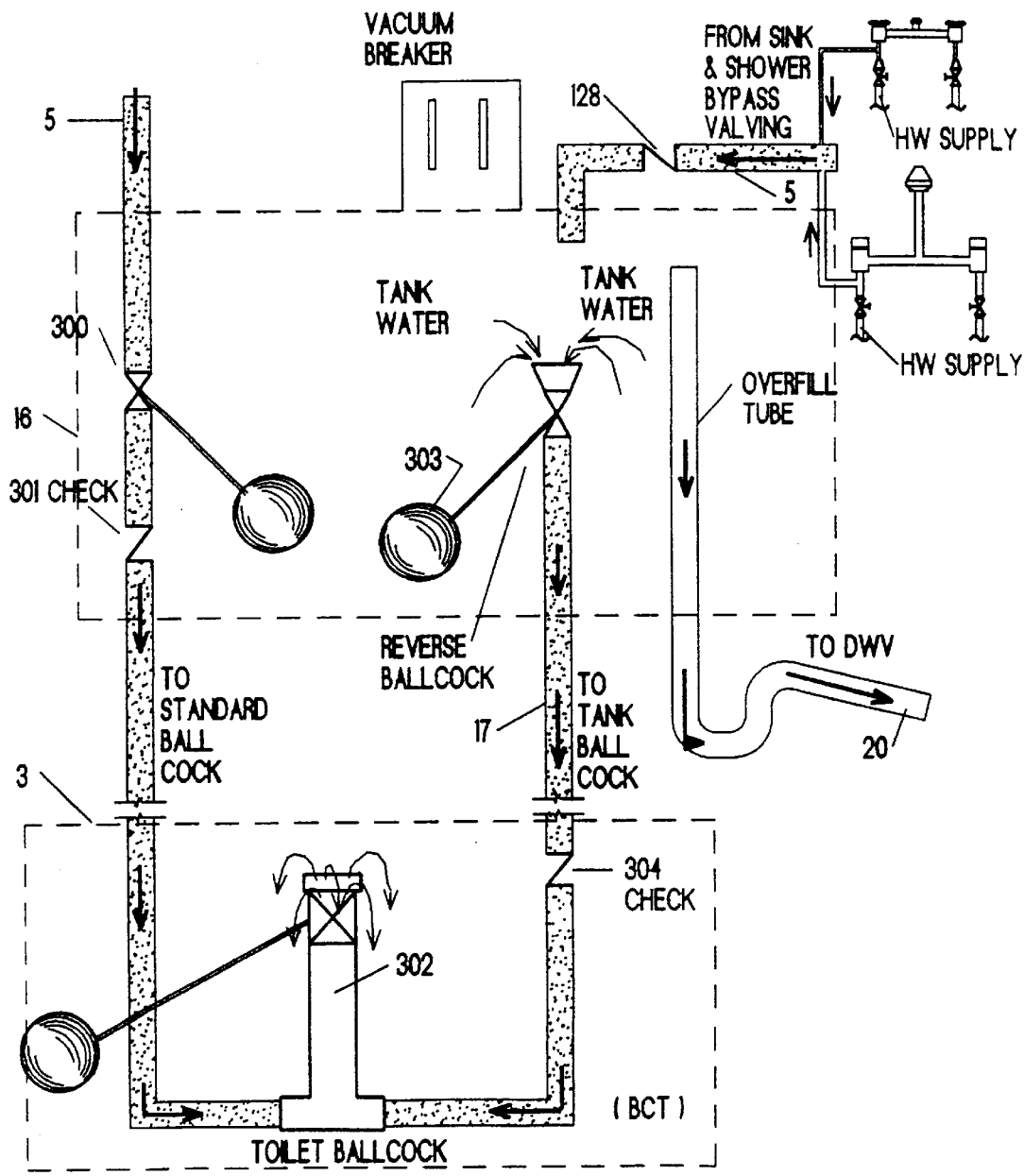
FIG. 8 is a diagrammatic representation of the dual-water closet configuration illustrated in FIGS. 1 through 4.

Details of the operation of a dual-water closet embodiment, such as the dual-water closet embodiments shown in FIGS. 1 through 4, is set forth with reference to FIG. 8 as follows. A cold water supply pipe 5 passes through the holding tank 16 and enters the primary water closet 3. A positive-acting ball-float valve 300 disposed inside of the holding tank 16 prevents water from flowing through the cold water supply pipe 5 into the primary water closet 3 when the holding tank 16 contains water. A check valve 301 is located between the float valve 300 of the holding tank 16 and the ballcock 302 of the primary water closet 3. When the ballcock 302 of the primary water closet 3 is open and the float valve 300 of the holding tank 16 is open, water may flow into the primary water closet 3 from the cold water supply pipe 5.

Diverted water enters the holding tank 16 via diverter pipe 15. A check valve 128 may be located in diverter pipe 15 to prevent backflow through the diverter pipe 15. The holding tank 16 is in fluid communication with the primary water closet 3 through a discharge pipe 17. Flow through the discharge pipe 17 is controlled by the ballcock 302 of the primary water closet 3 and the reverse ballcock 303 of the holding tank 16. When the ballcock 302 of the primary water closet 3 is open and the reverse ballcock 303 of the holding tank 16 is open and the float valve 300 of the holding tank 16 is closed, water will be passed from the holding tank 16 to the primary water closet 3 though the discharge pipe 17 on demand from the primary water closet 3. A check valve 304 in the discharge pipe 17 prevents flow of water through discharge pipe 17 from the primary water closet 3 to the holding tank 16.

It will be appreciated that the water that is diverted to the holding tank 16 may be diverted, directly or indirectly, to other areas to be used on demand for other purposes.

As noted above with reference to FIG. 1, and further, with reference to FIG. 3, when the ambient water in hot water supply pipe 9 between the hot water source 2 and the hot water valve 13 is below a predetermined or pre-selected temperature, the diverter valve 14 closes off water flow to the water discharge outlet 6 via hot water pipe 10. As the slug of ambient water passes the hot water valve 13, the temperature of the water in the hot water supply pipe 9 and, in particular, the temperature of the water passing in the vicinity of the control element 23 increases. When the temperature of the water passing the control element 23 is at or above a predetermined or preselected level, the control element 23 causes the diverter valve 14, preferably a thermostatically controlled diverter valve, to automatically close, cutting off water flow to the holding tank 16 via diverter pipe 15, and automatically directs water flow to a water discharge outlet 6, such as a spigot, faucet, appliance, shower faucet and head assembly, or a combination of the same, via hot water pipe 10.

It will be appreciated that a system constructed as shown in FIGS. 1 and 3 will allow heated water, that is, water at or above a predetermined or pre-selected temperature, to flow to the water discharge outlet 6, such as a spigot, faucet, appliance, shower faucet and head assembly, or a combination of the same, from the hot water supply pipe 9.

Of course, ancillary to a control element 23 in combination a diverter valve 14, the hot water valve 13 (also shown in FIGS. 2, 4, 9 and 13), may control water flow. For example, when showering operations are complete, the hot water valve 13 may be closed, thus preventing water flow through the hot water supply pipe 9 and the diverter valve 14.

It will also be appreciated that plumbing systems according to the present invention may conserve the slug of ambient water in the hot water supply pipe 9 by diverting the ambient water to holding tank 16 or blending it with injected hot water originating from a pressurized hot water source 2, such as a water heater, via a shunt pipe 80 (see FIGS. 2, 4, 11 and 13), or by a combination thereof.

It will further be appreciated that, in a system constructed as shown in FIG. 1, and further, in FIGS. 2, 4, 9 and 13, the cold water valve 12 is opened as desired to regulate the flow of cold water into and through the shower head 6. Alternatively, as is illustrated in FIG. 3, a control element 23 may be provided in communication with a valve, fitting, or other flow regulating device 24, such as a cold water lock-out valve, in the cold water pipe 7a. In this embodiment, when the control element 23 detects low temperature water in the hot water supply pipe 9a, it triggers the valve 24 to permit water flow through the diverter pipe 15 to the holding tank 16. Under normal operation, both the cold water valve 12 and the hot water valve 13 are open. Initially, no water will flow from the water discharge outlet 6, shown in the drawings as a faucet or shower, until a sufficiently high temperature is detected by the control element 23 in the hot water supply pipe 9a. It should be noted that, although the cold water valve 12 and hot water valve 13 are shown as manual valves, throttle valves are preferred.

In the embodiment shown in FIG. 2, a diverter valve, fitting, or other flow regulating device 14 is manually controlled as opposed to being thermostatically controlled, as is illustrated in FIG. 1 and set forth above. This embodiment may be advantageously used in applications where the distance between the hot water source 2 and the water discharge outlet 6, and the corresponding volume of ambient water which may be captured in the hot water supply pipe 9, is relatively minor. In such instances, prior to using hot water, the diverter valve 14 may be adjusted for a short time, so that it diverts the water from the hot water supply pipe 9 to the holding tank 16 (via diverter pipe 15) or otherwise. Then, the diverter valve 14 position is restored so as to divert flow to the water discharge outlet 6 via pipe 10.

In the embodiment illustrated in FIG. 4, a diverter valve, fitting, or other flow regulating device 114, preferably a manual adjustable, thermostatically controlled MATC diverter valve, is installed along the hot water supply pipe 9. An example of a MATC diverter valve is illustrated in FIGS. 5–7 and described above. In accordance with the MATC diverter valve shown, a handle 125 is provided which permits the MATC diverter valve to be manually adjusted. Further, as discussed above, when water entering the MATC diverter valve is below a predetermined or preselected temperature, based on the position of the handle 125, a bimetallic sensor 123 compresses and allows ambient temperature water to flow to the holding tank 16 (via diverter pipe 15). When the water entering the MATC diverter valve is sufficiently warm or hot, the bimetallic sensor closes, cutting off flow to the holding tank 16 (via diverter pipe 15), and directs flow instead to the water discharge outlet 6 (via hot water pipe 10).

Unlike the water conservation system constructed as illustrated in FIGS. 1 and 3, the water conservation system constructed illustrated in FIGS. 2 and 4 provides for the diversion of clean water to a holding tank 16 without the use of supplemental power sources and, in particular, does not require the use of supplemental pumps or electrically powered sensors.

It will be further appreciated that any of the foregoing water conservation systems are well suited for retrofit applications with the exception of the MATC diverter valve which can be constructed using common plumbing materials and supplies.

Figure 10:
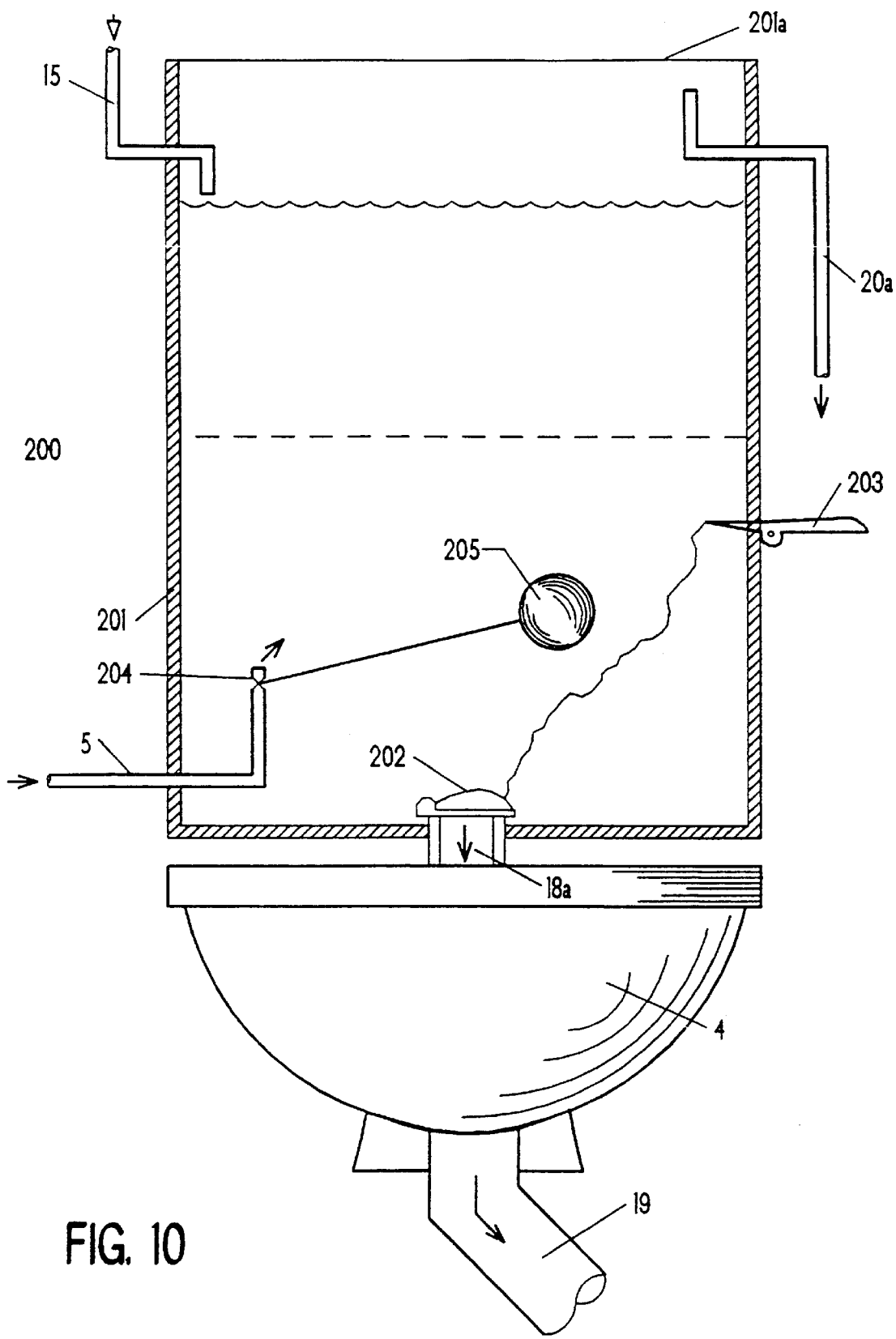
FIG. 10 is a partial cross-sectional, partial side elevational view of the extended water closet and adjoining toilet ball illustrated in FIG. 9.

FIGS. 9 and 10 illustrate another embodiment of the present invention in which water is diverted via diverter pipe 15 to a holding tank which is in the form of a single, extended water closet 200. As illustrated in FIG. 10, the extended water closet 200 preferably comprises a vessel 201, shown here as an open vessel, which has a volumetric capacity in excess of the volume of water which is necessary to complete a flushing cycle of a toilet bowl 4. The bottom of the vessel 201 is connected to the toilet bowl 4 by discharge pipe 18a, which has a discharge valve 202, such as a flapper valve, connected to a manual handle 203. Water may enter the vessel 201 via the cold water supply pipe 5. An inlet valve 204 is in the cold water supply pipe 5. The inlet valve 204 is shown connected to a control element 205, such as the float shown. Water may enter the vessel 201 via the cold water supply pipe 5 only when the level of the water inside of the vessel 201 is below a predetermined or preselected elevation, or below the elevation of the float as shown here. Whenever the water level inside of the vessel 201 is above the predetermined or pre-selected elevation (or above the float), the inlet valve 204 will remain closed and water flow into the vessel 201 via the cold water supply pipe 5 will be prohibited. As further illustrated in FIG. 10, the top 201a of the vessel 201 is at a significantly higher elevation than the maximum elevation of the determined by the control element 205. It is preferable that the volumetric capacity of the vessel 201 above the maximum elevation permitted by the control element 205 is at least as great as the volumetric capacity of the vessel 201 below the maximum elevation permitted by the control element 205. Water diverted from the water discharge outlet 6 (via diverter pipe 15) enters the upper end of the vessel 201, thus providing water to the extended water closet 200.

When the vessel 201 is full of water, additional water diverted to the extended water closet 200 will over flow through the overflow pipe 20 to the waste or drain pipe 19.

FIG. 11 illustrates how, when a second pipe, namely, a hot water shunt pipe 80, is used in conjunction with or without some of the components described hereinabove, water is delivered to the water discharge outlet 85 (via a valve, fitting, or other flow regulating device, such as the faucet or shower shown, or some other device such as a spigot or appliance or fixture) through both a hot water supply pipe 9 and the shunt pipe 80 is simultaneously mixed at the at or upstream of the water discharge outlet 6.

More particularly, FIG. 11 illustrates an alternative water conservation system in which a shunt pipe 80 is connected to the discharge side 8 of a hot water source 2, such as the hot water heater shown. The shunt pipe 80 preferably runs parallel to the hot water supply pipe 9. As set forth in the foregoing description, the hot water supply pipe 9 preferably has a diameter greater than that of the shunt pipe 80 and the hot water faucet supply tube 82. For example, the diameter of the hot water supply pipe 9 is preferably ⅜ inch to ⅞ inch. The diameter of the shunt pipe 80 is preferably ¼ inch to ⅝ inch (the shunt pipe 80 may vary in diameter throughout its run in order to maintain flow pressure). Lastly, the diameter of the hot water faucet supply tube 82 is preferably ¼ inch to ¾ inch. The length of the shunt pipe 80 is preferably no greater than the length of the hot water supply pipe 9. It will be appreciated that because the diameter of the shunt pipe 80 is smaller than the diameter of the hot water supply pipe 9, the volume of ambient water inside the hot water supply pipe 9 will be greater at any given instant than the slug or volume of ambient water inside of the shunt pipe 80. It will also be understood that because both the shunt pipe 80 and the hot water supply pipe 9 are connected to the discharge side of the hot water source 2, the shunt pipe 80 and the hot water supply pipe 9 are under the same pressure. However, because both the shunt pipe 80 and the hot water supply pipe 9 discharge either directly or indirectly into the hot water faucet supply tube 82, the water which flows through the hot water supply pipe 9 encounters a valve, fitting or other flow regulating device, such as a reducer fitting 86 shown in the hot water supply pipe 9, or such as the fitting 84 upstream in the hot water faucet supply tube 82.

Owing in part to the constriction encountered by water flowing from the hot water supply pipe 9 to the hot water faucet supply tube 82, an initial slug of ambient, or relatively cool, water inside the shunt pipe 80 will be purged (i.e., discharged through the water discharge outlet 6) more quickly than will an initial slug of ambient, or relatively cool, water inside of the hot water supply pipe 9.

As soon as the initial ambient, or relatively cool, water is purged from the shunt pipe 80, hot water will thereafter flow through it. Thus, it will be understood that hot water will initially be shunted from the hot water source 2 to the water discharge outlet such as through a hot water faucet supply tube 82 more quickly than will hot water flowing through the hot water supply pipe 9. Because water will continue to flow through both the shunt pipe 80 and the hot water supply pipe 9 to the water discharge outlet (via the hot water faucet supply tube 82), the water temperature inside of the hot water faucet supply tube 82 will be a weighted average of the mixed water supplied thereto from the shunt pipe 80 and the hot water supply pipe 9.

It will also be understood that an embodiment of the present invention comprising a shunt pipe 80 provides a means for accelerated delivery of hot or heated water to the water discharge outlet 6 than would be available with hot water supply pipe 9 alone. It will be further understood that because of how quickly the water discharged through the water discharge outlet 6 as the water becomes heated, there may be less ambient water wasted (while waiting for the water at the water discharge outlet 6 to heat up). These benefits may be further enhanced by insulating the shunt pipe 80 and other hot water pipes 9, 9a, and 10 in accordance with recognized practices.

It should be appreciated that the reason the smaller diameter shunt pipe 80 is purged more quickly than the larger diameter hot water supply pipe 9 is because of the relatively greater flow restriction encountered by water flowing through hot water supply pipe 9 than by the water flowing through the shunt pipe 80 as each is discharged into the hot water faucet supply tube 82.

The disparity between the water flow resistance created by the hot water pipes, such as that encountered in the shunt pipe 80 (which diameter may deviate from one end to the other in order to maintain appropriate flow pressure) and the hot water supply pipe 9, may be enhanced by providing a constriction valve, fitting, and/or other flow or pressure regulating device, such as the fitting 86 shown in the hot water supply pipe 9.

Figure 12:
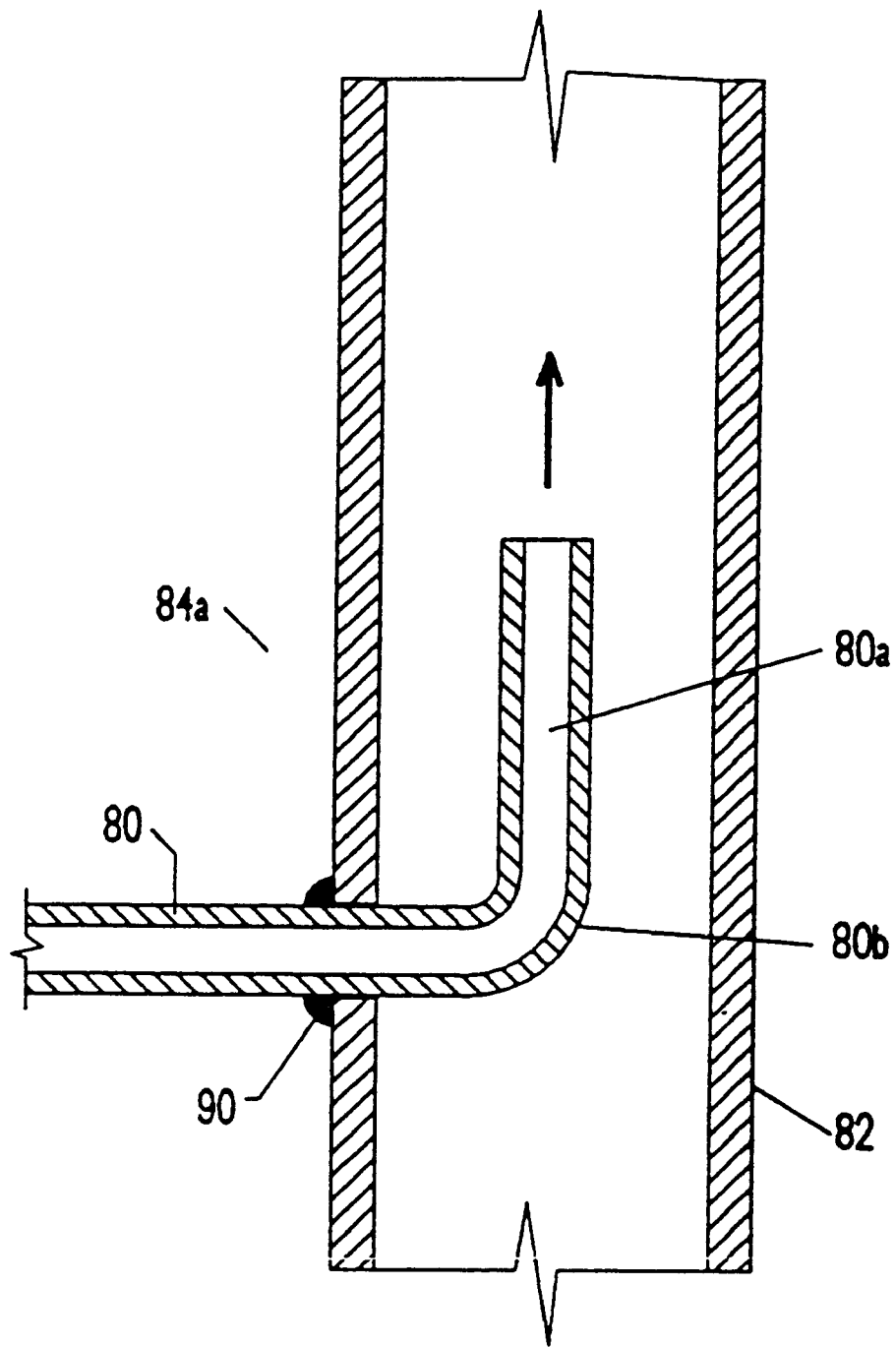
FIG. 12 is a cross-sectional view of a fitting comprising coaxial pipe and tube member for connecting the shunt pipe at the intersection of the hot water supply pipe and the hot water faucet supply tube.

The disparity between the flow restriction encountered by water discharged from the shunt pipe 80 and the hot water supply pipe 9 may be enhanced by reducing the pressure drop at the point of intersection between the shunt pipe 80 and the hot water supply pipe 9 such as with the use tee or tee/wye intersection fittings. It is preferable that the tee/wye intersection fittings be long radius fittings that sweep in the direction of the water flow to the water discharge outlet 6. Alternatively, the intersection of shunt pipe 80 and the hot water supply pipe 9 and/or the hot water faucet supply tube 82 may be formed with a modified reducing tee 84a, as shown in FIG. 12 and introduced above. This fitting is intended to reduce the pressure drop at the point of intersection between the shunt pipe 80 and the hot water faucet supply tube 82. In this fitting 84a, the shunt pipe 80 intersects the wall of the hot water supply pipe 9 and turns (with the direction of flow) within the run of the tee, and further terminates in concentric alignment with the flow in hot water faucet supply pipe 82. Silver solder 90 mechanical or similar means may be used to ensure a water tight joint between the shunt pipe and the hot water supply pipe 9.

It will be appreciated that the water that would otherwise be stored for later use or subsequently used in a water closet 3 or holding tank 16 could be redirected and become available on demand for other purposes. The improvement illustrated in FIG. 13 takes full advantage of the foregoing benefits even in the absence of a holding tank 16. The improvement illustrated in FIG. 13 exemplifies a water conservation system which uses elements set forth about but eliminates the need for a holding tank 16 and associated plumbing. Instead a diverter valve 114 comprising an integral control element and valve, fitting, or other flow regulating device, such as a manually adjustable thermostatically controllable MATC valve (such as that in shown in FIG. 4, illustrated in detail in FIGS. 5 through 7, and described detail above), takes advantage of the benefits of the hot water supplied by the shunt pipe 80 and the ambient water supplied by the hot water supply pipe 9. In this configuration, the hot water and ambient water streams are diverted internally to provide hot water directly to a water discharge outlet 6.

The diverter valve 114 is used in conjunction with a discharge valve, fitting, or other flow control device, such as a shower or faucet valve, at the water discharge outlet 6. The diverter valve 114 has three orifices and is placed in series with the hot water pipes 9a and 10 leading to the hot water discharge outlet 6. The diverter valve 114 is preferably orientated so that the hot water supply pipe 9 is attached to a first orifice 51. The shunt pipe 80 is preferably attached to a second orifice 52. Lastly, the hot water pipe 10 (leading to a discharge outlet 6) is attached to the third orifice 50. Thus the diverter valve 114 is located in between the hot water source 2 and a water discharge outlet 6.

In this embodiment, the diverter valve is adjusted to a desired position (via handle 125) to achieve a desired temperature setting (at the water discharge outlet 6) and requires no further adjustment, even when hot water is in use, that is, when hot water is being discharged from the discharge outlet 6. In this embodiment, the diverting functions are performed internally and automatically, that is to say, the ambient is diverted internally, with the hot water plumbing system even in the absence of holding tanks 16 and the like.

Initially when a person wishes to discharge water from a water discharge outlet 6 (such as via a spigot, faucet, fixture, appliance or the like), after a period of non-use the user may adjust a valve or other regulating device at a terminal atmosphere discharge fixture outlet as he or she would normally. Although, as has been previously mentioned, in situations such as those presented in typical plumbing systems, a inert slug of ambient water must first be purged from the hot water plumbing system before truly heated water can be obtained at the water discharge outlet 6. However, in this embodiment, after a period of non-use, heated water flows immediately, without delay (mechanically or thermally).

A pressure drop caused by discharge through a water discharge outlet 6, such as by using a spigot, faucet, fixture, appliance or the like, allows water to flow through both the shunt pipe 80 and the hot water supply pipe 9 in varying amounts. This water flow may be supplied, for example, from water entering into the diverter valve 114 through two valve orifice openings simultaneously, namely, orifice 52 (connected to the shunt pipe 80) and orifice 51 (connected to the hot water supply pipe 9), and subsequently exiting from the diverter valve 114 through one common orifice opening 50 (a mixer of water from the shunt pipe 80 and the hot water supply pipe 9). In other words, water flowing through the shunt pipe 80 and the hot water supply pipe 9 is blended internally during discharge operations via the diverter valve 114 and this blended water is then discharged through the water discharge outlet 6, such as through the operation of a spigot, faucet, fixture appliance or the like, via the common hot water supply pipe 9.

In operation, the diverter valve 114, for example, initially diverts a larger quantity of water from the shunt pipe 80 through orifice 52 and this water passes through the valve body and exits through orifice 50. Simultaneously, a lesser amount of ambient water passes through the orifice 51 and it converges with the water introduced by the shunt pipe 80 through orifice 52. This convergence of water from the shunt pipe 80 and the hot water supply pipe 9 immediately makes heated water available at the water discharge outlet from orifice 50 of the diverter valve 114.

It should be appreciated that, after a period of operation, the slug or volume of ambient water initially contained in hot water supply pipe 9 is dissipated. The bimetal 123 of the diverter valve 114 detects this increase in water temperature occurring in hot water supply pipe 9 and responds by regulating more flow through orifice 51 and shuttering or reducing flow through orifice 52. This eventually results in equal flow of water though both orifice 52 and orifice 51.

In particular the regulated quantities from orifice 52 and orifice 51 is the result of the preset position of the diverter valve 114 and/or the automatic adjustment of the diverter valve 114 resulting from a change in water temperature during a water discharge operation.

It should be appreciated that in hot water plumbing systems, a hot water source 2, such as a hot water heater, may typically supply hot water to a plurality of water discharge outlets, such a spigots, faucets, appliances, shower faucet and head assemblies, or other fixtures or devices. In such systems, the various water discharge outlets may be fed by a single common trunk hot water pipe. When a trunk hot water pipe feeds, for example, bathroom sink faucets and/or kitchen sink faucets, the pipe connections at the faucets may be a smaller diameter than the trunk hot water pipe. As discussed in the example above, and with reference to FIG. 11, the hot water supply pipe 9 preferably has a diameter greater than that of the hot water faucet supply tube 82. Accordingly, the hot water supply pipe 9 is preferably ⅜ inch to ¾ inch in diameter, and the hot water faucet supply tube 82 is preferably ¼ inch or ⅝ inch in diameter. Also, as discussed above, this reduction in pipe dimension results in a flow restriction which can be taken advantage of in the present invention by the shunt pipe 80.

However, in installations having multiple fixture services, such as bath tub faucets and shower heads, where there is not typically a reduction in diameter between the trunk pipe and the fixture pipe, it may be desirable to install a regulating device, such as a flow or pressure, compensating or balancing valve, fitting, or device; or throttle valve, in the hot water supply pipe 9 in order to introduce a flow control mechanism which would enhance the disparity between the flow restriction encountered by water discharged from the shunt 80 and the hot water supply pipe 9 during operation. Similarly, the flow control mechanism offers regulation of the water pressure at a water discharge outlet when low pressure situations arise or when water is being discharged simultaneously at one or more other water discharge outlets.

It should be appreciated that metallic hot water supply plumbing materials conduct heat more readily than hot water supply plumbing materials made of a low heat conductive material, such as plastic. For instance, when a hot water system is not in use, stand-by losses are localized to those hot water supply plumbing materials directly attached and adjacent to the hot water source 2. However, when hot water is discharged through water discharge outlets 6, this heat is conducted, or lost, throughout the hot water supply plumbing materials, for example, perpendicularly though the water pipe walls, and travels longitudinally, or parallel, through the water pipe enroute to the water discharge outlets 6.

Further, after a period of time, when the hot water plumbing system is in use, heat conductivity spreads and is absorbed by other attached hot water supply plumbing materials and continues to lose heat. However, over time, the hot water supply plumbing materials may eventually become concentrated with heat, allowing less heat to be conducted, or lost, for example, through the water pipe walls and more heat to be conducted down stream with the water, and thus, carried with the water through the water discharge outlet 6.

When this happens, it results in a higher mixed water temperature at the water discharge outlet 6. The user must then manually adjust, for example, the shower or sink faucet valve to a desired mixed water temperature in order to offset the effect of this temperature rise.

Additionally, it is a well known occurrence that heat that is transferred through metallic hot water supply plumbing materials during periods of non-use may result in a variety of temperatures differences throughout the plumbing system. These temperature differences may fluctuate over a period of time causing natural circulation within plumbing system loops. This sometimes results in greater energy demands being placed on the hot water source 2 during periods of non-use.

The embodiment mentioned below utilizes a thermal breaking means which retards thermal circulation when the plumbing system is not in use and eliminates, or substantially delays, the time it takes for the water temperature to rise at the water discharge outlet during a period of use. It does this by disrupting the conductive continuity of the hot water supply plumbing materials.

As shown in FIGS. 2, 4 and 11, a low heat conductivity material, or a thermal break element 156, is inserted in the hot water supply pipe 10 to disrupt the heat traveling, or conducted, towards the water discharge outlet 6, such as the faucet or shower. The thermal break element 156 may be a common pipe nipple or other similar low conductive material, such as a plastic fitting, placed upstream in the hot water supply pipe 9.

This thermal break element 156 has a similar application in retarding stand-by losses and natural circulation which may occur when the shunt pipe 80 is not made of low conductance material (such as plastic). In accordance with the embodiments illustrated in FIGS. 2, 4, and 11, the hot water supply pipe 10 and the water discharge outlet fixture is shunted with shunt pipe 80. A thermal break element 156 is disposed in the shunt pipe 80 and is shown.

While the above description set forth specific details, these details should not be construed as limitations on the scope of the invention, but rather as examples of various embodiments. Many other variations are possible. For example, low temperature water may be diverted to a common atmospheric pressure holding tank. A thermal break 156 or check valve 130 may be installed between a thermally controlled diverter valve 14 and a water discharge outlet to prevent short cycling or to retard the effects of heat conduction. Manually adjustable, thermostatically controlled diverter valves constructed different from the MATC diverter valve shown and described above may be used, including: MATC diverter valves with internal and external sensors; MATC diverter valves which comprise electrical sensors; and MATC diverter valves that are solenoid actuated. A blending valve or shunt pipe may be used independently. Moreover, water may be diverted for use in other areas other than in holding tanks or water closets.

Similarly an automatic pressure balancing valve may be installed in the hot water supply pipe 9 with or without the MATC diverter valve or shunt arrangement, or with an existing diverter valve, or other discharge fixture, in order to stabilize the pressure in the hot water supply pipe during operation.

It should be understood that wherever the terms line, pipe, conduit, tube or the like are used above, other common fluid transfer devices, elements, components or the like could be employed in their place.

The present invention is not limited to having a primary water closet and holding tank but may include a single vessel having two interior chambers. Moreover; a diverter configuration may be used independently of a shunt configuration, and a shunt configuration may likewise be used independently of a diverter configuration.

It should further be understood that the instant invention is not limited in its application to use as a water conservation system but may be applicable in any and all situations where it is desirable to conserve fluid flow and fluid resources.

It is to be further understood that the present invention is not limited to the embodiments described above, but encompasses any and all embodiments within the scope of the following claims.

I claim:

1. A unidirectional, non-recirculating, potable hot water supply arrangement which engages only primary domestic hot water supply source water pressure to accelerate the delivery of useable heated water from the hot water source to a terminal hot water atmospheric discharge fixture outlet following an interval of inert flow within the hot water conduit members;

said hot water arrangement includes the use of a pressurized hot water source having a supply conduit aperture, piping members, fittings and terminal hot water atmospheric discharge fixture outlet(s), which are arranged such that the fluid content between the hot water source and the terminal hot water discharge fixture outlet remains inert between fixture uses, and impetus movement of said fluid is initiated solely by the opening of a terminal hot water atmospheric discharge fixture outlet situated down stream of said hot water heat source, such that flow activity is exercised from the hot water source to the hot water atmospheric discharge outlet fixture;

said system further comprising;

a first heated water supply delivery pipe having a first end inlet and a second end; and a second heated water supply delivery pipe having a first end inlet and a second end, wherein said first end inlet of said first hot water supply delivery pipe is disposed at the hot water source aperture means and said second end of said first hot water supply delivery pipe is in fluid communication with an downstream hot water atmospheric discharge outlet;

and wherein the second end of said second hot water supply delivery pipe is in fluid communication with said second end of said first hot water supply delivery pipe and the downstream terminal atmospheric fixture discharge outlet such that said second end of said second hot water supply delivery pipe is disposed between the second end of the first hot water supply delivery pipe and the downstream hot water atmospheric fixture discharge outlet, and wherein its first end is in communication with said first end of said first hot water supply delivery pipe wherein water which has passed through the hot water appurtenance only one time is conducted from the first to second end of said first conduit and from first to second end of said second conduit in such a manner as to provide the same upon the discharging of the terminal hot water atmospheric discharge outlet, whereas upon initial use of said outlet the supply hot water temperature arriving at the outlet expeditiously rises to a useable hot water temperature and subsequently stabilizes at the temperature at or above that of the hot water heating source, wherein the supply heated water flows through each conduit at a percentage designated by its structure.

2. The invention according to claim 1, further comprising:

at least a first fitting comprising a first orifice, a second orifice, and a third orifice, wherein said first orifice is connected to said second end of said first pipe, said second orifice is connected to said second end of said second pipe, and said third orifice is in fluid communication with the discharge outlet.

3. The invention according to claim 2, further comprising:

a control element, wherein said control element is coupled to said first fitting to selectively direct flow entering said first orifice through said second and third orifices.

4. The invention according to claim 3, wherein said control element is a manual control.

5. The invention according to claim 3, wherein said control element comprises a temperature sensor, and wherein said first fitting is structured and configured to be responsive to said temperature sensor to selectively direct flow entering said first orifice of said first fitting through said second orifice upon sensing flow entering said first orifice at a temperature below a predetermined temperature and through said third orifice upon sensing flow entering said first orifice at a temperature equal to and above the predetermined temperature.

6. The invention according to claim 3, further comprising:

a unidirectional flow device having a first end and a second end, wherein said unidirectional flow device is in fluid communication with said first fitting and the discharge outlet such that said first end of said unidirectional flow device is disposed between the third end of said first fitting and the discharge outlet.

7. The invention according to claim 3, further comprising:

a holding tank, wherein said first end of said second pipe is in fluid communication with said holding tank.

8. The invention according to claim 7, wherein said unheated receptacle is an water closet amenity tank; wherein after initial entrance into said tank said water is prohibited from re-entering into the domestic supply water stream due to the pressure difference between said tank atmospheric pressure head and domestic supply pressure, said tank further comprising an intrinsic mechanical self-contained manually operated water flushing and filling control valve with positive water shut off means wherein said control means is the sole means that regulates the water filling and flushing of said tank to the said domestic waste stream.

9. The invention according to claim 2, further comprising:

a temperature responsive control element, and a manual control element, wherein said first fitting is structured and configured to be responsive to said temperature responsive control element to selectively open said second orifice of said first fitting upon sensing flow through said first orifice at a temperature equal to and above a predetermined temperature and close said third orifice of said first fitting upon sensing flow through said first orifice at a temperature below the predetermined temperature; and wherein said manual control element is coupled to said first fitting to regulate flow entering said first orifice of said first fitting through said second orifice.

10. The invention according to claim 9, further comprising:

a second fitting comprising a first orifice and a second orifice, wherein said first orifice of said second fitting is in fluid communication with a flow source and said second orifice is in fluid communication with the discharge outlet; and wherein said second fitting is structured and configured to be responsive to said temperature responsive control element to selectively open said second fitting upon sensing flow through said first orifice of said first fitting at a temperature equal to and above a predetermined temperature and restrict flow through said second fitting upon sensing flow through said first orifice of said first fitting at a temperature below the predetermined temperature.

11. The invention according to claim 2, further comprising:

wherein the first pipe has a first diameter and the second pipe has a second diameter; and wherein the first diameter is larger than the second diameter.

12. The invention according to claim 11, further comprising:

a second fitting comprising a first orifice, a second orifice, and a third orifice, wherein said first orifice is connected to the heat source outlet and said second orifice is connected to said first end of said second pipe, thus defining the connection between the heat source outlet and the first end of the second pipe, and said third orifice is connected to the first end of the second pipe.

13. The invention according to claim 12, wherein said first fitting comprises:

a run having a wall, a first end, and a second end; and a third pipe having a first end and a second end, wherein said first end of said run defines said first orifice of said first fitting and said second end of said run defines said third orifice of said first fitting; and wherein said first end of said third pipe defines said second orifice of said first fitting and said second end of said third pipe intersects said wall of said run and turns with a direction of flow within said run and terminates substantially in concentric alignment with said third orifice of said first fitting.

14. The invention according to claim 12, further comprising:

a temperature responsive control element, and a manual control element, wherein said first fitting is structured and configured to be responsive to said temperature responsive control element to selectively open said first orifice of said first fitting upon sensing fluid in said first pipe at a temperature equal to and above a predetermined temperature and close said first orifice of said first fitting upon sensing fluid in said first pipe at a temperature below the predetermined temperature; and wherein said manual control element is coupled to said first fitting to regulate flow entering said second orifice of said first fitting through said second orifice.

15. The invention according to claim 12, further comprising:

a third fitting having a first orifice and a second orifice; and a control element;

wherein said first orifice of said third fitting is connected to said second end of said first pipe and said second orifice of said third fitting is connected to said first orifice of said first fitting, thus defining the connection between the second end of the first pipe and the first orifice of the first fitting; and wherein said control element comprises a manual control; and wherein said is structured and configured to constrict fluid flow therethrough upon adjusting said manual control.

16. The invention according to claim 12, wherein said second pipe further comprises a thermal break.

17. The invention according to claim 12, wherein said first pipe further comprises a thermal break.

18. The invention according to claim 12, wherein said first pipe further comprises a pressure compensation device.

19. The invention according to claim 1, further comprising:

wherein a uniflow valve is disposed in said first pipe between said first end and second end in fluid communication with the heated source and discharge outlet.

20. The invention according to claim 1, further comprising:

wherein a uniflow valve is disposed in said second pipe between said first and second end and is in fluid communication with the unheated discharge outlet piping and the heated discharge outlet piping; and.

21. The invention according to claim 1, further comprising:

a bi flow valve comprising a first orifice and a second orifice, wherein said valve is disposed between first end of said second pipe and the second end of the second pipe and is in fluid communication with the unheated discharge outlet and the heated discharge outlet; and wherein said valve is structured and configured to be responsive to said temperature responsive control element to selectively open said fitting upon sensing a temperature equal to or below a predetermined temperature and restrict flow through said fitting upon sensing a temperature above the predetermined temperature; and.

22. The invention according to claim 21, wherein further comprising a valving means structured and configured with a manual responsive control element to open and to restrict flow through said first and second orfice and.

23. The invention according to claim 21, wherein further comprising a responsive control element whereas said fitting is structured and configured to allow open flow through first and second orfice after initial operation then independently restricting such flow after a preset period and.

24. The invention according to claim 21, wherein further comprising a responsive control element whereas said fitting is structured and configured to initiate flow through first and second orfice upon use of the discharge outlet; wherein the control element is in communication with unheated fixture; and.

25. The invention according to claim 21, wherein further comprising a remote accuated solenoid valve whereas said fitting is structured and configured to open and restrict flow through said first and second orfice upon operation of a remote element.

* * * * *